United States Patent
Ghidi et al.

(10) Patent No.: US 10,457,903 B2
(45) Date of Patent: Oct. 29, 2019

(54) TANK FOR WINE FERMENTATION

(71) Applicant: U.G.C. SAS DI GHIDI PIETRO & C., Buggiano (IT)

(72) Inventors: Pietro Ghidi, Pescia (IT); Marco Ghidi, Montecarlo (IT); Pier Paolo Ghidi, Pescia (IT)

(73) Assignee: U.G.C. SAS DI GHIDI PIETRO & C., Buggiano (IT)

( * ) Notice: Subject to any disclaimer, the term of this patent is extended or adjusted under 35 U.S.C. 154(b) by 90 days.

(21) Appl. No.: 15/523,277

(22) PCT Filed: Oct. 29, 2015

(86) PCT No.: PCT/IB2015/058336
§ 371 (c)(1),
(2) Date: Apr. 28, 2017

(87) PCT Pub. No.: WO2016/067227
PCT Pub. Date: May 6, 2016

(65) Prior Publication Data
US 2017/0313964 A1 Nov. 2, 2017

(30) Foreign Application Priority Data
Oct. 31, 2015 (IT) ................................ PI2014A0080

(51) Int. Cl.
*C12G 1/02* (2006.01)
(52) U.S. Cl.
CPC .................................... *C12G 1/02* (2013.01)
(58) Field of Classification Search
CPC ...................................................... C12G 1/02
See application file for complete search history.

(56) References Cited

U.S. PATENT DOCUMENTS 2,813,026 A * 11/1957 Marcilly .................. C12G 1/02
426/15
3,910,173 A * 10/1975 Zepponi .................. A23N 1/00
222/460

(Continued)

FOREIGN PATENT DOCUMENTS

IT          PT20090018         5/2011

OTHER PUBLICATIONS

English Abstract of IT PT20090018.
(Continued)

*Primary Examiner* — Eric Keasel
(74) *Attorney, Agent, or Firm* — Preston Smirman Smirman IP Law, PLLC

(57) ABSTRACT

The tank comprises a cylindrical vessel, air tight sealing means, pressure control means, and in addition: a first gas adduction nozzle, located in proximity of the bottom of the cylindrical vessel; a second gas adduction nozzle, provided at an intermediate height of the cylindrical vessel; a third gas adduction nozzle, provided in the upper part of the cylindrical vessel, above the maximum level reached by the liquid; power and control means, functionally connected to the pressure control means, first, second and third gas adduction nozzles, adapted to determine for the same respective predetermined operative phases, in order to perform vinification processes with controlled oxidation, even without the addition of sulphites. The tank is advantageously equipped with organs for taking the must from the bottom and spreading it from the top, by up-down shaking, activated by the power and control means.

20 Claims, 2 Drawing Sheets

(56) References Cited

U.S. PATENT DOCUMENTS

| | | | |
|---|---|---|---|
| 4,593,611 A | 6/1986 | Bruch | |
| 4,665,807 A * | 5/1987 | Rieger | B01F 5/10 99/277.1 |
| 4,773,315 A * | 9/1988 | Enenkel | C12J 1/10 99/277 |
| 4,856,421 A * | 8/1989 | Whitford | C12G 1/02 99/276 |
| 5,014,612 A * | 5/1991 | Gresch | C12G 3/08 99/276 |
| 6,125,736 A * | 10/2000 | Marin | C12G 1/02 99/276 |
| 6,631,732 B1 * | 10/2003 | Koster | C12G 1/0216 137/571 |
| 2017/0321175 A1 * | 11/2017 | Floridia | C12G 1/0216 |

OTHER PUBLICATIONS

International Search Report dated Feb. 16, 2016.
Written Opinion of International Searching Authority dated Feb. 16, 2016.
International Preliminary Report on Patentability dated Nov. 2, 2016.

* cited by examiner

TANK FOR WINE FERMENTATION

CROSS-REFERENCE TO RELATED APPLICATION

The instant application is a national phase of PCT International Application No. PCT/IB2015/058336, filed Oct. 29, 2015, and claims priority to Italian Patent Application Serial No PI2014A000080, filed Oct. 31, 2014, the entire specifications of both of which are expressly incorporated herein by reference.

TECHNICAL FIELD

The present invention relates to wine-making equipment, with particular reference to the tanks in which processes take place of vinification.

BACKGROUND ART

These processes, subject to the basic modes which are very old and largely immutable, have different characteristics when they refer to red or white wine and, thereafter, according to the grape variety, the area, the regional or local traditions and, not least, customizations specific to each winery.

In general, technical progress has brought a much more scientific approach in the process of winemaking, from the past, which has raised the quality of products and has allowed a better control of the organoleptic properties of wines as well as the presence and concentration of certain substances.

Among the vinification processes there are particular ones, directed to sparkling white wines, which require a second fermentation: in bottles for champagne method (also called classic method) or by autoclaving, for the method called Martinotti or Charmat.

This method, also called 'of second fermentation in autoclave', provides that the wine is moved between various pressurized tanks by pumps and external piping, which though hygienically controlled, do not completely avoid contamination of the product which may affect its preservation.

In fact, the sparkling process in autoclave, suitable for aromatic and/or fruity wines, gives rise to products not suitable for aging, but which have to be drunk preferably within the year, which are also defined, by the experts, 'ready to drink'.

An example of this type of conventional fermentation technology is described, for example, in U.S. Pat. No. 4,593,611 which proposes adaptations improvement of conventional plants in which the wine is transferred between different tanks via pumps and pipes. In an embodiment of the cited patent, the wine is recirculated continuously and fed back into the fermentation tank through pipes with a star shape with holes or nozzles and arranged at three different heights inside the tank, namely at the bottom, at an intermediate height and the upper part of the tank above the level of the liquid. Moreover, the cited patent discloses that along the path of the pipelines, outside the tank, may be heat exchangers and other devices between which also valves for the intake of air in the piping in order to oxygenate the wine. As already mentioned, a solution such as that above provides that the wine has continually to pass through pipes that run outside the fermentation tank and equipped with various devices such as the aforementioned heat exchangers, valves, pumps, which, being in some cases removable to be used in association with different tanks, may cause contamination of wine. Furthermore, the said apparatus, although allowing to oxygenate the wine through addition of air, does not allow to exactly adjust the amount of air present inside the tank nor allows to use the same air to keep moving the wine inside the tank. With such apparatuses it is therefore always necessary to provide for the addition of chemical products that serve to stabilize and preserve the wine.

It is known that in order to stabilize and preserve the wine, while preserving perfumes and aromas, sulphites are used, such as sulfur dioxide, sodium bisulfite, and others, added in the appropriate concentration, subjected to precise limits of law.

The sulfur dioxide is added and is also generated spontaneously by the fermentation of the grape skins.

Sulfites, which incidentally are used as preservatives in many other foods, are not considered harmful to health products, at least with low concentrations, but the overall trend is to reduce them, especially for certain lines of products defined biological.

The law provides for the wine, with concentrations below 10 mg/l, may be omitted, on the label, the word «contain sulfites».

The aforementioned technical progress has obviously affected all equipment used in winemaking, so that even those of more ancient origin, such as the tanks, have evolved to become tanks equipped with modern and sophisticated devices, often controlled by computers.

The same applicant, dated Nov. 18, 2009 filed the patent application for industrial invention n. PT2009A000018 entitled 'Serbatoio destinato al controllo dei processi di vinificazione, affinamento e conservazione dei vini e, in genere, per il mescolamento e il mantenimento dei liquidi con sostanze in sospensione e per l'insufflazione di gas tecnici', in which is protected a technical solution in which is provided a pipe, arranged substantially in axis with the tank and extending vertically towards the bottom of the latter, operated with movement of up and down by an actuator displaced superiorly to the tank itself.

At the lower end of the pipe it is made integral with a plate or disc, which during the aforesaid up and down movement performs an action of flapping in the liquid in which it is immersed.

Inside the pipe there is provided a non-return valve, combined with a suitable filter, which allows the liquid to enter from the lower opening of the pipe during the movement downwards, preventing subsequently, when moving upwards, the outlet, so that with the succession of up and down strokes the pipe is progressively 'loaded' with the liquid; the latter flows from a slot provided in the pipe above the level of the liquid, going to 'water' the marc hat.

The wine-making tank proposed with the patent application cited above allows an effective movement of the must without having to provide pumps and pipes external to the tank and therefore without any risk of contamination of wine contained in it.

In said tank is also provided a system for the insufflation of technical gases, such as inert materials such as nitrogen argon, carbon dioxide, or possibly treated air, with said system comprising nozzles arranged in the lower part of the tank.

The insufflation system referred to in the above, enables to control, among other things, the dynamics of the fermentation process, by dosing at will the amount of oxygen contained in the liquid, eliminating it completely, by means of blowing of only inert gases, if you want to stop the oxidation and prolong the wine preservation time. In this way it is possible to reduce the amount of sulfite to be added for proper preservation. In addition, the blowing of gas from the bottom of the tank also involves handling of the lees which tend to settle on the bottom. This handling operation of the lees is extremely desirable in certain stages of the fermentation process while it is entirely undesirable and has to be avoided in other phases, which must then be performed by stopping the blowing of gas or transferring the wine to other types of tanks.

DISCLOSURE OF INVENTION

Summary of the Invention

The object of the present invention is to propose a tank suitable to allow the vinification processes while limiting the amount of added sulphites, up to completely avoiding it.

Another object of the invention is to provide a tank in which is possible to control all stages of the vinification, maceration, fermentation, aging and maturation, opportunely dosing, and in a selective way, the amount of oxygen present both in the liquid mass and in the free volume above this.

Another object of the invention is to allow to determine and maintain predetermined values of pressure inside the tank during the various stages of the vinification.

A further object of the invention concerns the fact of being able to use the tank as an effective storage container for long term storage of the wine, while minimizing the degradation.

Still another object of the invention provides to realize a tank in which all the vinification processes take place in its interior, so without being necessary to move outside the liquid mass contained in it.

Still another object of the invention provides to realize a tank able to keep back in suspension the solid components deposited on the bottom, such as 'lees', in order to facilitate the extraction of 'noble' substances (e.g. mannoproteins) and favor their chemical bond, without having to adopt moving devices of mechanical type and without being necessary to move outside the liquid mass.

Another object of the present invention is to provide a tank for wine-making that allows to oxygenate the liquid content without causing the movement of the lees deposited on the bottom.

Another object of the present invention is to provide a tank for wine-making that allows for the creation of a preservation environment in the absence of oxygen without requiring the movement of the liquid contents.

Another further object of the invention is to have a tank prepared so that it can be equipped with organs for moving down-up the must, also of a type such as not to require moving the liquid mass outside of the tank.

Still a further object of the invention is to obtain a tank provided with means for command and control, able to implement and monitor, in automatic mode, operating cycles of vinification.

The foregoing objects are fully achieved by a wine-making tank, of the type in which means are provided for the adduction of technical gases within the same tank, the latter comprising:

air-tight sealing means (4), associated with the top of the cylindrical vessel with a vertical axis defining said tank;

pressure control means, adapted to define and maintain a predetermined pressure within said cylindrical vessel;

first gas adduction nozzles, associated to said gas supply means for the supply of gases, provided inside said cylindrical vessel and located close to the bottom of the latter;

second gas adduction nozzles, associated with said gas supply means for supply of gases, provided inside said cylindrical vessel and located at an intermediate height of the latter;

third gas adduction nozzles, associated to said gas supply means for the supply of gases, provided inside said cylindrical vessel and located in the upper part of the latter, above the maximum level reached by the liquid contained therein;

power and control means, functionally connected to said pressure control means, first, second and third gas adduction nozzles, adapted to determine respective predetermined operative phases, in order to perform vinification processes with controlled oxidation.

DESCRIPTION OF DRAWINGS

The characteristics of the invention will be made evident in the following description of a preferred embodiment of the tank, according to what reported in the claims and with the aid of the accompanying drawing tables, in which:

DESCRIPTION OF PREFERRED EMBODIMENTS

In the figures listed above has been indicated with the reference 1, the tank object of the invention, as a whole.

The tank 1 comprises a cylindrical vessel 2 with a vertical axis, made for example of stainless steel for food use and is provided, at the base, with suitable supporting legs 3.

Figure 1:
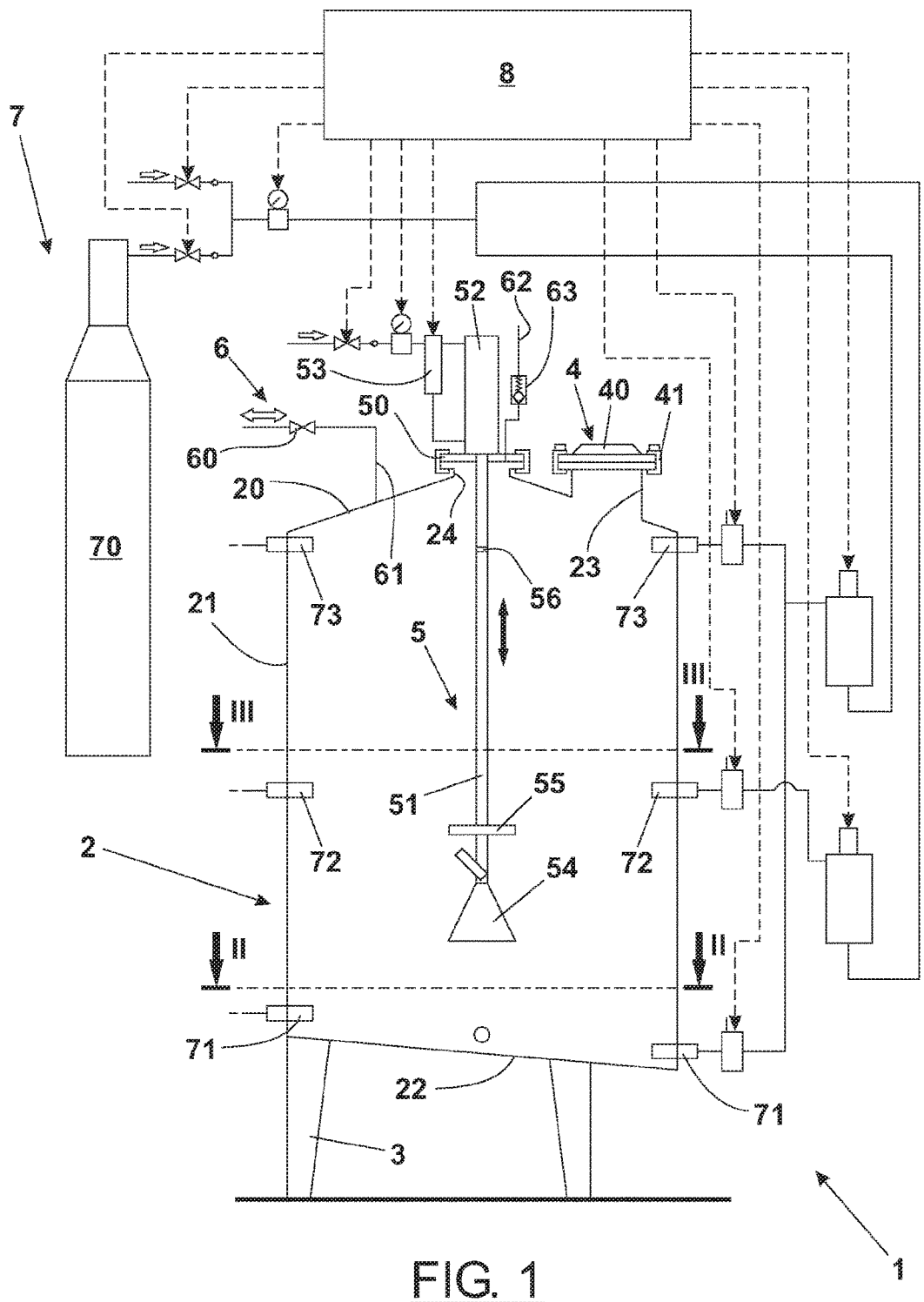
FIG. 1 illustrates, in schematic side view, a tank of the invention associated with its air system and power and control means.

The cylindrical vessel 2 is closed at the top by a cover 20, preferably provided in one body with the lateral wall 21 and with the bottom 22, the latter being suitably sloped (FIG. 1).

The cover 20 forms a first filler neck 23, for example in a decentered position, facing upward and associated with air tight sealing means 4 that can be open and closed.

In the illustrated embodiment said air tight sealing means 4 are constituted, for example, by a door 40 manually operated, placed to cover the mentioned first filler neck 23 and coupled to the fastening means 41, for example of clamping means, comprising suitable airtight seals; said means 41 are not illustrated in detail since of known type.

In a variant embodiment not shown, said airtight sealing means 4 are motor driven, constituted for example by a sealing element (valve or the like), movable from an open position to a closed, and vice versa, by means of an actuator.

In addiction, the cover 20 provides a second central filler neck 24, arranged to engage sealingly with a flange 50 which supports organs for moving the must down-up 5, portions of which extending within the cylindrical vessel 2; said organs 5 are advantageously provided associated to the tank 1, although not mandatorily, and will be described in more detail hereinafter.

Where the mentioned organs for moving the must down-up 5 were absent, or there is the need of removing them, there is provided a lid, not shown, intended to sealingly close said second central filler neck 24.

In the lid 20 are also provided pressure control means 6, adapted to define and maintain a predetermined pressure within said cylindrical vessel; said means 6 comprises:
- a first pipe 61, communicating with the outside and opening within the cylindrical vessel 2, along which is placed a double-effect valve 60 which maintains the ambient pressure, or a slight over-pressure, in the volume above the liquid;
- a second pipe 62, communicating with the outside and opening within the cylindrical vessel 2, along which is placed a maximum pressure valve 63, or discharge valve, which opens automatically upon reaching a predetermined pressure value inside of the vessel 2 itself.

The tank 1 is provided, in a known manner, with gas supply means 7 for supplying technical gases to the vessel 2, such as inert gas such as nitrogen argon, carbon dioxide or possibly treated air.

The inert gases are taken from a corresponding cylinder 70, while the air is taken from a compressed air source, not shown, which is preferably provided with filter units of known type, adapted to purify it in a proper manner. Alternatively, also the compressed air is supplied from a cylinder under pressure.

The gas supply means 7 comprises, in a manner known to experts of air systems and therefore not described in detail, suitable flow meters, pressure gauges, non-return valves in addition of course to the piping, fittings and whatever else necessary. According to the invention, in said power supply means 7 are provided:
- first gas adduction nozzles 71, associated to the lateral wall 21 of said cylindrical vessel 2 and located close to the bottom 22 of the latter and which open inside it;
- second gas adduction nozzles 72, associated to the lateral wall 21 of said cylindrical vessel 2 and located at an intermediate height of the lateral wall 22 of and which open inside it;
- third discharge nozzles of gas 73, associated with the lateral wall 21 of said cylindrical vessel 2, which open inside it at the top, above the maximum level reached by the liquid contained therein.

The supply ducts suitable for the micro-oxygenation, that is to say in a preferred embodiment of the invention those associated with said second gas adduction nozzles 72, also comprise at least one porous candle adapted to increase the air-liquid exchange surface.

In addition, the supply means 7 comprise integrated pressure reducers that reduce the pressure of the gases coming from the cylinders to values between 1.5 bar and 2.5 bar. This enables to directly connect the compressed gas cylinders to an outlet with rapid fastening means of said supply means 7 without the need to purchase external pressure reducers to be connected to the cylinders.

Figure 2:
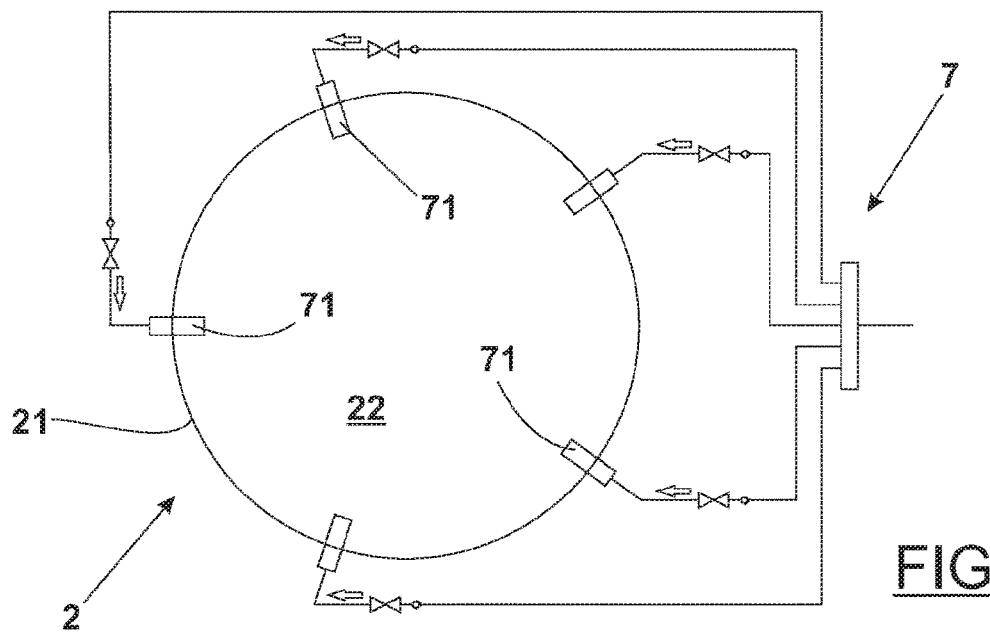
FIG. 2 shows a schematic plan view of the tank, along the plane II-II of FIG. 1.

Said first gas adduction nozzles 71 are arranged radially, for example five in number, angularly equidistant (FIG. 2), and are adapted to inflate inert gas and/or air intended to move the liquid mass, to stir the lees precipitated in the lower volume of this and to cause an upward movement of the carbon dioxide present, so as to bring it in the free volume of the upper vessel itself, over the liquid mass.

Figure 3:
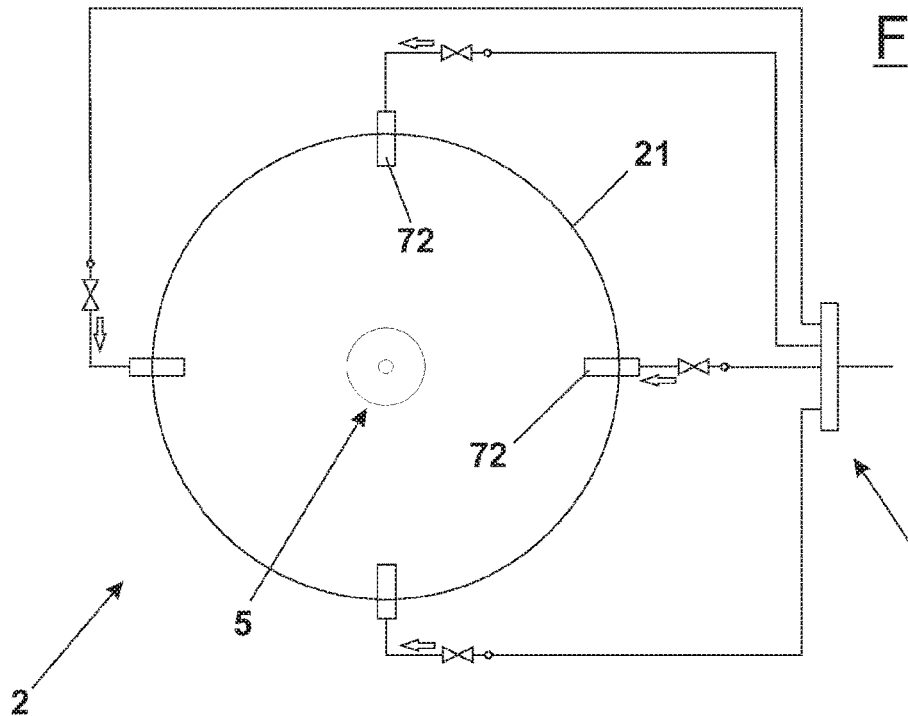
FIG. 3 illustrates a schematic plan view of the tank, along the plane III-III of FIG. 1.

Said second gas adduction nozzles 72 are arranged radially, for example four in number and angularly equidistant (FIG. 3), and are adapted to inflate inert gas and/or air intended to determine a micro-oxygenation of the liquid mass, without moving the lees.

Said third gas adduction nozzles 73 are arranged radially, for example four in number and angularly equidistant (see again FIG. 3) and are adapted to inflate inert gas and/or air in the upper free volume of said cylindrical vessel, over the liquid mass, said gas being mixed appropriately in order to slow down or accelerate the process of oxidation of the must. In particular, inflating inert gas through the third adduction nozzles 73 allows for the elimination, more or less completely, of the air from the upper free volume of the vessel without causing any handling of the liquid mass.

To the tank 1 are associated, outside of the cylindrical vessel 2, power and control means 8, functionally connected with said pressure control means 6, supply means 7 and respective first, second and third gas adduction nozzles 71, 72, 73, adapted to determine respective predetermined operative phases, in order to perform vinification processes with controlled oxidation, even without the addition of sulphites; the same power and control means 8 are also adapted to drive the above-mentioned air-tight sealing means 4 if they are motor driven.

Said power and control means 8 are preferably of the type comprising an electronic processor (not shown) equipped with suitable software adapted to control the various processes.

As previously mentioned, to the tank 1 are associated organs for taking the must from the bottom and spreading it from the top 5, by up-down shaking, activated by said actuation power and control means 8.

According to the preferred constructive solution illustrated, these organs 5 for moving down-up the must are according to the technical solution protected by the patent application n. PT2009A000018, in the name of the same Applicant, already mentioned in the introduction.

They, therefore, comprise a pipe 51, arranged substantially in axis with the cylindrical vessel 2 and extending vertically towards the bottom 22 of the latter, operated with movement of up and down by an actuator 52 displaced superiorly to the tank itself.

Said actuator 52 is constituted, for example, by a double-acting pneumatic cylinder, powered by an external source of compressed air and controlled by a solenoid valve 53 adapted to alternately exchange the flow direction.

At the lower end of the pipe 51 there is integral a suction bell 54, above which is provided a plate 55 which, during the aforesaid movement of ups and downs, performs an action of flapping in the liquid in which it is immersed.

Inside the pipe 51 there is provided a non-return valve, combined with a suitable filter (both not shown), which allows the liquid to enter from the suction bell 54 during the downward movement of the pipe 51, preventing later, while moving upwards, the reverse flow, so that with the succession of up and down strokes the pipe 51 is progressively 'loaded' with the liquid; the latter flows out from a slot 56 provided in the pipe 51 itself above the level of the liquid, going to 'water' a marc (i.e., pomace) layer that may float on the liquid contained in the tank 1.

The tank 1 can be associated with known cooling means, not illustrated, placed on the outside of the cylindrical vessel 2 and adapted to cool the liquid mass contained in it.

The tank 1 described above can performs all the processes of winemaking, maceration, fermentation, aging and maturation, by setting the aforementioned power and control means 8 to implement the appropriate operating sequences, time-outs and all matters regarding the enological knowledge of the operators; therefore, it is omitted to describe the said sequences, as innumerable and especially irrelevant for the purposes of explaining the potential of the invention, which are obvious to experts in the field.

In fact, opportunely dosing, and in a selective way, the pressure inside the cylindrical vessel and the quantity of oxygen present both in the liquid mass and in the free volume above this it is possible to make wine while limiting the amount of added sulphites, up to completely avoid it.

By suitably commanding the nozzles and the type of technical gas introduced it is also possible to control all stages following winemaking, such as refinement, maturation and long-term storage.

It is important to highlight that, in the tank proposed, all processes take place within the vessel, avoiding any possible contamination of the product, unlike the systems of the known art.

The fact of providing the tank equipped with organs for moving the must down-up, without moving it outside, is advantageous to increase the versatility and effectiveness of the invention.

Thanks to the presence of the power and control means having an electronic processor, it is possible to implement and monitor, in an automatic way, any operating cycle, including long-lasting operating cycles.

It is understood however that what above is just a not limiting example, therefore any modifications of details that may be necessary due to technical and/or functional reasons, are considered since now as falling within the same protective scope defined by the claims below.

The invention claimed is:

1. A wine-making tank system, comprising:
   a cylindrical vessel;
   a gas supply device for supplying gases within the cylindrical vessel;
   an air-tight sealing device operably associated with a top portion of the cylindrical vessel;
   a pressure control device adapted to define and maintain a pre-determined pressure level within the cylindrical vessel;
   a first gas adduction nozzle operably associated with the gas supply device, wherein the first gas adduction nozzle is provided inside the cylindrical vessel and located proximate to a bottom portion of the cylindrical vessel;
   a second gas adduction nozzle operably associated with the gas supply device, wherein the second gas adduction nozzle is provided inside the cylindrical vessel and located at an intermediate height of the cylindrical vessel, and wherein the second gas adduction nozzle is adapted to insufflate an inert gas or air, wherein the insufflated inert gas or air is operable to determine a micro-oxygenation of a liquid mass contained in the cylindrical vessel without disturbing any solid parts contained in the cylindrical vessel;
   a third gas adduction nozzle operably associated with the gas supply device, wherein the third gas adduction nozzle is provided inside the cylindrical vessel and located proximate to an upper portion of the cylindrical vessel, and being above a pre-determined maximum level of a liquid contained in the cylindrical vessel, and wherein the third gas adduction nozzle is adapted to insufflate an inert gas or air into a free upper volume of the cylindrical vessel and over a liquid mass contained in the cylindrical vessel, wherein the insufflated inert gas or air is present in a mixture that is operable to slow down or accelerate a process of oxidation of any must contained in the cylindrical vessel;
   a power and control device operably associated with the pressure control device and first, second and third gas adduction nozzles.

2. The wine-making tank system according to claim 1, wherein the first gas adduction nozzle is operably associated with a lateral wall of the cylindrical vessel with a radial arrangement, and wherein the first gas adduction nozzle is adapted to insufflate an inert gas or air so as to move a liquid mass, to stir solid parts precipitated in a lower volume of the cylindrical vessel, and to cause an upward movement of any carbon dioxide contained in the cylindrical vessel so as to bring the carbon dioxide into a free upper volume of the cylindrical vessel and over the liquid mass.

3. The wine-making tank system according to claim 1, wherein the second gas adduction nozzle is operably associated with a lateral wall of the cylindrical vessel with a radial arrangement.

4. The wine-making tank system according to claim 1, wherein the third gas adduction nozzle is operably associated with a lateral wall of the cylindrical vessel with a radial arrangement.

5. The wine-making tank system according to claim 1, wherein the air tight sealing device includes a manually actuated door, a filler neck provided in a cover of the cylindrical vessel and fastened by a clamping device.

6. The wine-making tank system according to claim 1, wherein the air tight sealing device is operably associated with a filler neck provided in a cover of the cylindrical vessel, wherein the air tight sealing device is motor driven, wherein the air tight sealing device is movable from an open position to a closed position by an actuator.

7. The wine-making tank system according to claim 6, wherein the motor driven air tight sealing device is adapted to be driven by the power and control device.

8. The wine-making tank system according to claim 1, wherein the pressure control device comprises:
   a first pipe communicating with an outside atmosphere and leading into the cylindrical vessel;
   a double-effect valve operably associated with the first pipe and adapted to maintain an ambient pressure level or an overpressure level in the free upper volume above the liquid contained in the cylindrical vessel;
   a second pipe communicating with the outside atmosphere and leading into the cylindrical vessel; and
   a maximum pressure valve operably associated with the second pipe, and being adapted to open automatically upon reaching of a pre-determined pressure level inside the cylindrical vessel.

9. The wine-making tank system according to claim 1, wherein, inside the cylindrical vessel, organs are provided for taking any must from the bottom portion and spreading it from the top portion, by an up and down shaking motion that is activated by the power and control device.

10. The wine-making tank system according to claim 1, wherein the cylindrical vessel is comprised of stainless steel suitable for food use, and wherein the bottom portion is sloped and provided with a plurality of supporting legs.

11. A wine-making tank system, comprising:
    a cylindrical vessel;
    a gas supply device for supplying gases within the cylindrical vessel;
    an air-tight sealing device operably associated with a top portion of the cylindrical vessel;
    a pressure control device adapted to define and maintain a pre-determined pressure level within the cylindrical vessel;

a first gas adduction nozzle operably associated with the gas supply device, wherein the first gas adduction nozzle is provided inside the cylindrical vessel and located proximate to a bottom portion of the cylindrical vessel;

a second gas adduction nozzle operably associated with the gas supply device, wherein the second gas adduction nozzle is provided inside the cylindrical vessel and located at an intermediate height of the cylindrical vessel, and wherein the second gas adduction nozzle is adapted to insufflate an inert gas or air;

a third gas adduction nozzle operably associated with the gas supply device, wherein the third gas adduction nozzle is provided inside the cylindrical vessel and located proximate to an upper portion of the cylindrical vessel, and being above a pre-determined maximum level of a liquid contained in the cylindrical vessel, and wherein the third gas adduction nozzle is adapted to insufflate an inert gas or air into a free upper volume of the cylindrical vessel and over a liquid mass contained in the cylindrical vessel;

a power and control device operably associated with the pressure control device and first, second and third gas adduction nozzles.

12. The wine-making tank system according to claim 11, wherein the first gas adduction nozzle is operably associated with a lateral wall of the cylindrical vessel with a radial arrangement, and wherein the first gas adduction nozzle is adapted to insufflate an inert gas or air so as to move a liquid mass, to stir solid parts precipitated in a lower volume of the cylindrical vessel, and to cause an upward movement of any carbon dioxide contained in the cylindrical vessel so as to bring the carbon dioxide into a free upper volume of the cylindrical vessel and over the liquid mass.

13. The wine-making tank system according to claim 11, wherein the second gas adduction nozzle is operably associated with a lateral wall of the cylindrical vessel with a radial arrangement.

14. The wine-making tank system according to claim 11, wherein the third gas adduction nozzle is operably associated with a lateral wall of the cylindrical vessel with a radial arrangement.

15. The wine-making tank system according to claim 11, wherein the air tight sealing device includes a manually actuated door, a filler neck provided in a cover of the cylindrical vessel and fastened by a clamping device.

16. The wine-making tank system according to claim 11, wherein the air tight sealing device is operably associated with a filler neck provided in a cover of the cylindrical vessel, wherein the air tight sealing device is motor driven, wherein the air tight sealing device is movable from an open position to a closed position by an actuator.

17. The wine-making tank system according to claim 16, wherein the motor driven air tight sealing device is adapted to be driven by the power and control device.

18. The wine-making tank system according to claim 11, wherein the pressure control device comprises:
a first pipe communicating with an outside atmosphere and leading into the cylindrical vessel;
a double-effect valve operably associated with the first pipe and adapted to maintain an ambient pressure level or an overpressure level in the free upper volume above the liquid contained in the cylindrical vessel;
a second pipe communicating with the outside atmosphere and leading into the cylindrical vessel; and
a maximum pressure valve operably associated with the second pipe, and being adapted to open automatically upon reaching of a pre-determined pressure level inside the cylindrical vessel.

19. The wine-making tank system according to claim 11, wherein, inside the cylindrical vessel, organs are provided for taking any must from the bottom portion and spreading it from the top portion, by an up and down shaking motion that is activated by the power and control device.

20. The wine-making tank system according to claim 11, wherein the cylindrical vessel is comprised of stainless steel suitable for food use, and wherein the bottom portion is sloped and provided with a plurality of supporting legs.

* * * * *